US012248278B2

(12) United States Patent
Wyssbrod et al.

(10) Patent No.: US 12,248,278 B2
(45) Date of Patent: Mar. 11, 2025

(54) KEY FOR HOLDING A DIAL ON THE PLATE OF A HOROLOGICAL MOVEMENT

(71) Applicant: ETA SA Manufacture Horlogère Suisse, Grenchen (CH)

(72) Inventors: Baptist Wyssbrod, Nidau (CH); Matthieu Erard, Courroux (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 385 days.

(21) Appl. No.: 17/807,532

(22) Filed: Jun. 17, 2022

(65) Prior Publication Data

US 2023/0042355 A1 Feb. 9, 2023

(30) Foreign Application Priority Data

Aug. 9, 2021 (EP) .................................... 21190391

(51) Int. Cl.
*G04B 19/14* (2006.01)

(52) U.S. Cl.
CPC .................................... *G04B 19/14* (2013.01)

(58) Field of Classification Search
CPC ...... G04B 19/14; G04B 29/04; G04B 19/065; G04G 17/045; Y10T 403/7058; Y10T 74/2084; Y10S 411/935
See application file for complete search history.

(56) References Cited

U.S. PATENT DOCUMENTS

| | | | | |
|---|---|---|---|---|
| 3,523,417 A * | 8/1970 | Katsuhiko | G04B 19/14 | 968/157 |
| 4,183,204 A * | 1/1980 | Sauter | G04B 37/04 | 968/307 |
| 4,213,295 A | 7/1980 | Perrot | | |
| 5,699,324 A * | 12/1997 | Perrot | G04B 19/14 | 368/294 |
| 7,313,054 B2 * | 12/2007 | Matthey | G04B 19/065 | 368/236 |
| 8,817,580 B2 * | 8/2014 | Leoni | G04B 19/14 | 368/236 |

(Continued)

FOREIGN PATENT DOCUMENTS

EP 0 465 988 A1 1/1992

OTHER PUBLICATIONS

Office Action issued Jul. 4, 2023, in corresponding Japanese Patent Application No. 2022-106931 (with English Translation), 6 pages.

(Continued)

*Primary Examiner* — Edwin A. Leon
(74) *Attorney, Agent, or Firm* — Oblon, McClelland, Maier & Neustadt, L.L.P.

(57) ABSTRACT

A key for holding a dial foot, the key including a cylindrical head arranged at the end of a rod, the head and the rod being coaxial, the head including a flat and a collar extending over a portion of its periphery in an angular sector defined around the longitudinal axis of the rod, on either side of the flat. The collar includes a cross section with a frustoconical shape and, with respect to the periphery of the head, forms a minimum radial projection, substantially zero, at the ends of this angular sector and forms a maximum radial projection between these ends.

7 Claims, 1 Drawing Sheet

(56) References Cited

U.S. PATENT DOCUMENTS

2021/0165369 A1* 6/2021 Kaelin .................. G04B 19/14

OTHER PUBLICATIONS

Office Action issued Feb. 14, 2024, in corresponding Korean Patent Application No. 10-2022-0084468 (with English Translation), 9 pages.
European Search Report issued Jan. 11, 2022 in European Application 21190391.9, filed on Aug. 9, 2021 (with English Translation of Categories of cited documents).

* cited by examiner

KEY FOR HOLDING A DIAL ON THE PLATE OF A HOROLOGICAL MOVEMENT

CROSS-REFERENCE TO RELATED APPLICATION

This application claims priority to European Patent Application No. 21190391.9 filed on Aug. 9, 2021, the entire disclosure of which is hereby incorporated herein by reference.

TECHNICAL FIELD OF THE INVENTION

The invention relates to the field of horology, and in particular devices for securing an external part on a horological structure.

More particularly, the invention relates to a key for holding a dial on the plate of a horological movement.

Technological Background

Securing dials in timepieces, such as watches, is generally done by holding keys.

More particularly, these holding keys include a head intended to rest in abutment against a surface of the horological movement plate opposite to a dial. The head is connected to the end of a rod intended to be inserted by a tight fit in a housing in said plate, wherein it can be pivoted when sufficient torque for overcoming the friction forces is applied thereto.

The dial includes feet engaged in housings arranged in proximity to the housings in which the rods of the keys are inserted, and emerge on the surface of the plate opposite to the dial.

The keys include, around their head, a collar truncated in a direction parallel to the longitudinal axis of the rod, said collar having a frustoconical cross section and being intended to penetrate, by a cutting edge, in the adjacent foot following the pivoting of the key.

This penetration causes a tearing away of material forming a burr that may become detached from the dial foot and form swarf that can block or damage moving components of the horological movement.

Furthermore, a mechanical clearance may appear between the foot and the key if it is wished to once again attach an already deformed foot.

This solution for attaching the dial also generates high mechanical stresses on the foot and/or the key since the cutting edge by means of which the collar penetrates the foot is of relatively large size.

SUMMARY OF THE INVENTION

The invention solves the aforementioned drawbacks by proposing a solution allowing the holding of a dial without risk of causing tearing away of material of its feet.

More particularly, the invention aims to minimise the deformations of the foot, while guaranteeing clamping thereof by the key.

For this purpose, the present invention relates to a key for holding a dial foot, said key including a cylindrical head arranged at the end of a rod, the head and the rod being coaxial, the head including a flat and a collar extending over a portion of its periphery in an angular sector defined around the longitudinal axis of the rod, on either side of the flat.

The collar comprises a cross section with a frustoconical shape and, with respect to the periphery of the head, forms a minimum radial projection, substantially zero, at the ends of this angular sector and forms a maximum radial projection between these ends.

In particular embodiments, the invention may furthermore include one or more of the following features, taken in isolation or in accordance with all technically possible combinations.

In particular embodiments of the invention, the collar has a shape formed by revolution the revolution axis of which is off-centre with respect to the axis of the head.

In particular embodiments, the collar is arranged symmetrically on either side of a symmetry plane passing through the longitudinal axis of the head and orthogonal to the plane defined by the flat.

In particular embodiments, the maximum radial projection formed by the collar is diametrically opposed to the flat.

According to another aspect, the present invention also relates to a device for attaching a dial comprising at least one foot engaged through a first housing of a horological structure and at least one key as described previously, the rod of which is engaged in a second housing adjacent to the first housing. The device is configured so that, in a first angular position, referred to as the "position of rest", the flat avoids any contact with the foot and, in a second angular position, referred to as the "attaching position", when the key is rotated about the longitudinal axis of the head, from its position of rest as far as its attaching position, said collar comes into contact with the foot through the minimum radial projection that it forms with respect to the periphery of the head.

BRIEF DESCRIPTION OF THE FIGURES

Other features and advantages of the invention will emerge from the reading of the following detailed description given by way of in no way limitative example, with reference to the accompanying drawings, wherein.

DETAILED DESCRIPTION OF THE INVENTION

Figure 1:
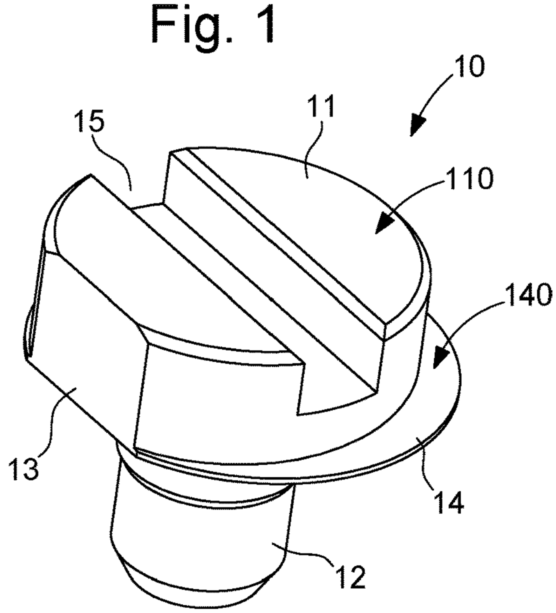
FIG. 1 shows a perspective view of a dial key according to a preferred example embodiment of the invention.

FIG. 1 shows a key 10 for holding a dial foot 20 according to the invention. The key 10 includes a cylindrical head 11 connected to the end of a rod 12 intended to be engaged in a housing produced in a horological structure, for example consisting of a horological movement plate 30.

The head 11 and the rod 12 extend along coaxial longitudinal axes. The head 11 comprises a top surface 110 opposite to a bottom surface 111. Here the terms "top" and "bottom" relate to the position of the key 10 as shown on FIGS. 1 to 5.

The bottom surface 111 defines a plane orthogonal to the longitudinal axes of the rod 12 and of the head 11 and is intended to rest in abutment against the plate 30 of the horological movement.

The head 11 includes a flat 13 extending between the top surface 110 and the bottom surface 111 and defining a plane parallel to the longitudinal axis of the head 11.

The head 11 furthermore includes a collar 14 arranged on a portion of its periphery, along an angular sector defined around the longitudinal axis of the head 11, on either side of the flat 13. The collar 14 has a frustonically shaped cross section, the surface area of which varies around the periphery of the head 11.

In particular, as illustrated by the figures, the collar 14 forms, with respect to the periphery of the head 11, a minimum or even substantially zero radial projection at the ends of the annular sector and forms a maximum radial projection between these ends.

The collar forms a minimum or even substantially zero radial projection in that it is negligible, for example is of the order of no more than one tenth of a millimetre.

In other words, the distance between the periphery of the head 11 and the periphery of the collar 14 is minimum at the ends of the angular sector along which the collar 14 extends and is maximum between these ends.

Figure 2:
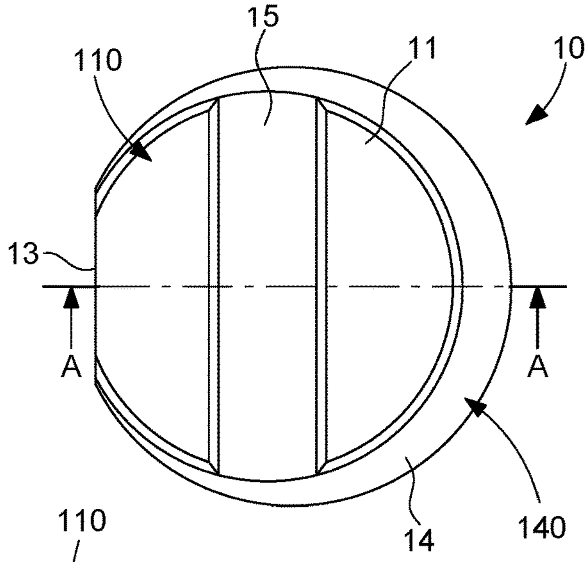
FIG. 2 shows a plan view of the key of FIG. 1.
Figure 3:
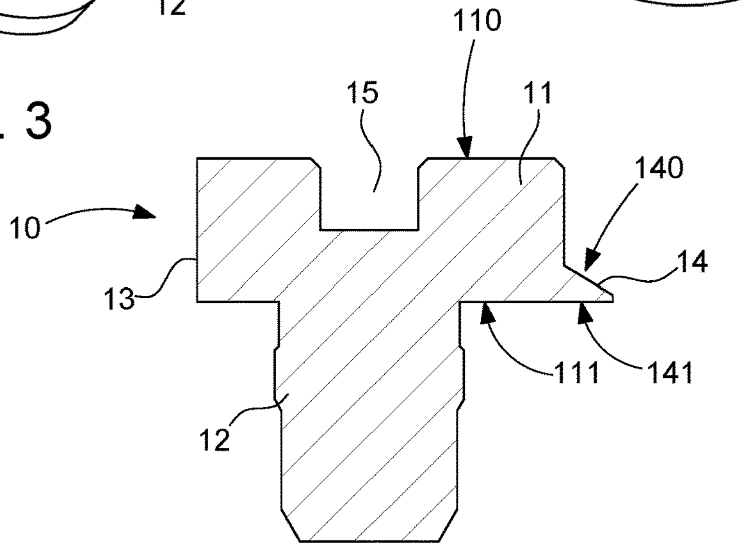
FIG. 3 shows a view in longitudinal section along the cross-sectional axis A-A in FIG. 2.

More precisely, as shown by the plan view in FIG. 2, the collar 14 has a shape formed by revolution the revolution axis of which is off-centre with respect to the axis of the head 11.

Advantageously, the collar 14 is arranged symmetrically on either side of a symmetry plane passing through the longitudinal axis of the head 11 and orthogonal to the plane defined by the flat 13. The maximum projection formed by the collar 14 is therefore diametrically opposed to the flat 13.

This feature makes it possible to be able to attach the dial foot 20 by pivoting the key 10 in the clockwise and anticlockwise direction.

The collar 14 is delimited by a top surface 140 and by a bottom surface 141.

The bottom surface 141 defines a plane coplanar with the plane defined by the bottom surface 111 of the head 11 and is intended to rest in abutment against the plate 30 of the horological movement. In other words, the bottom surface 141 of the collar 14 is located in line with the bottom surface 111 of the head 11, as shown by the cross-sectional view in FIG. 3.

The top surface 140 of the collar 14 is arranged so as to define with the bottom surface 141 an angle for example greater than 0 degrees and less than or equal to 45 degrees. The smaller this angle, the easier it is for the collar 14 to penetrate the dial foot 20, to the detriment of the resistance of said collar 14, and the larger the angle, the more the penetration into the foot 20 requires a high torque and the more the foot 20 is subjected to high strains.

Advantageously, the head 11 is configured so as to be able to receive and transmit a torque, and for this purpose comprises a conformation adapted for cooperating with a tool manipulated by a user.

Such a conformation is, in the example embodiment shown on the figures, formed by a diametral slot 15 extending from the top face of the head 11. The slot 15 is intended to receive a blade of a tool, for example a screwdriver.

Alternatively, such a conformation may be formed by a cavity with a non-circular cross section, a prismatic shape of the head 11, i.e. including flats on its periphery, for example, so that its cross section is polygonal in shape, etc.

The head 11 and the rod 12 have coaxial longitudinal axes, the torque is transmitted without parasitic lever-arm effect.

The present invention also relates more generally, according to another aspect, to a device for attaching a dial comprising at least one foot 20 engaged through a first housing of a horological structure, for example of the plate 30 of a horological movement.

Figure 4:
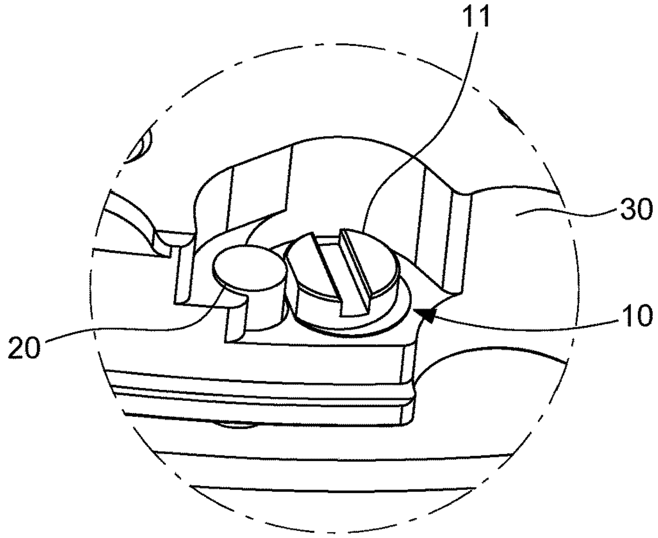
FIG. 4 shows a detail view of a device for attaching a dial, wherein the key is in the position of rest.
Figure 5:
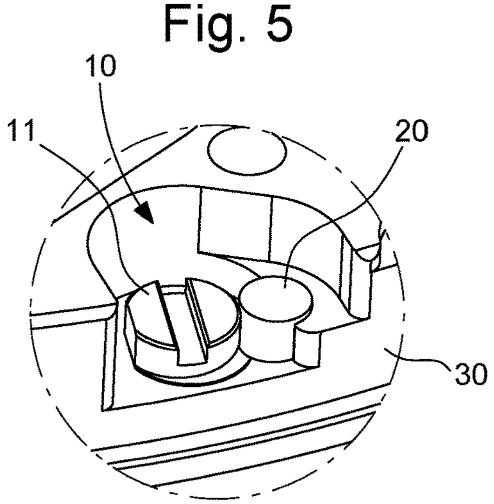
FIG. 5 shows a detail view of a device for attaching a dial, wherein the key is in the position of attaching a dial foot, said key exerting a maximum force on said foot.

The first housing is adjacent to a second housing receiving the rod 12 of the key 10, the attaching device being configured so that, in a first angular position, referred to as the "position of rest", as illustrated on the detail view of FIG. 4, the flat 13 escapes any contact with the foot 20, and so that, in a second angular position shown on the detail view of FIG. 5, referred to as the "attaching position", the collar 14 penetrates the foot 20.

More particularly, the attaching device is configured so that, when the key 10 is rotated about the longitudinal axis of the head 11, from its position of rest, it comes into contact with the foot 20 through the collar 14, first of all at the minimum radial projection formed by said collar 14.

The collar 14 then gradually penetrates the foot 20 during the rotation of the key 10, without risking causing the tearing away of material of the foot 20.

In particular, by virtue of the specific shape of the collar 14, radial and axial forces are exerted gradually within the foot 20, since the portion of the collar 14 penetrating the foot along with the rotation of the key 10 increases in thickness and in width.

The terms "thickness" and "width" here designate respectively the dimension of the collar in the radial direction and in an axial direction.

The flat 13 makes it possible to be able to arrange the first and second housings at a small distance from each other, and therefore enables the attaching device to gain in compactness.

The dial can easily be disconnected from the plate 30 by pivoting the key 10 to its position of rest.

Advantageously, by virtue of the features of the key 10, and in particular by virtue of the shape of the collar 14, one and the same dial foot 20 can be attached to the plate 30 and disconnected, and this several times.

Moreover, the present invention allows a very fine management of the degree of rotation of the key 10, and therefore of the penetration of the collar 14 in the dial foot 20.

The management of the degree of rotation of the key 10 is vital for enabling the optimum attachment of the dial foot 20, in that an excessively great rotation generates mechanical strains and an unnecessary deformation of material on the dial foot 20, and an excessively small rotation causes insufficient penetration of the collar 14 in the foot 20, and consequently insufficient attachment that may lead to accidental disconnection of the dial.

Management of the degree of rotation of the key 10 is all the more important since the degree of rotation necessary for achieving optimum attachment is variable depending in particular on the material from which the dial foot 20 is made, its hardness and its diameter, and the weight of the dial.

Furthermore, depending on the material from which the dial is made, it is necessary to finely control the degree of rotation of the key 10 to avoid cracks or visible deformations. This case may in particular be encountered when the dial is produced from a fragile material, for example mother-of-pearl, sapphire, ceramic, etc., or when it is thin.

Finally, it is also necessary to adjust the degree of rotation of the key 10 according to the number of attachment/disconnection cycles undergone by the dial. This is because, after an attachment/disconnection cycle, the attaching of the dial foot 20 is achieved by an angular movement of the key 10 greater than that implemented for the previous attachment in order to reach the same level of clamping force as that existing during said previous attaching.

The invention claimed is:

1. A key for holding a dial foot, said key comprising:

a cylindrical head arranged at an end of a rod, the head and the rod being coaxial, the head including a flat defining a plane extending continuously from a top surface of the head to a bottom surface of the head, and a collar extending over a portion of a periphery of the head in an angular sector defined around a longitudinal axis of the rod, on either side of the flat, wherein said collar comprises a cross section with a frustoconical shape and, with respect to the periphery of the head, forms a minimum radial projection at ends of the angular sector and forms a maximum radial projection between the ends.

2. The key according to claim 1, wherein the collar has a shape formed by revolution a revolution axis of which is off-center with respect to the axis of the head.

3. The key according to claim 1, wherein the collar is arranged symmetrically on either side of a symmetry plane passing through the longitudinal axis of the head and orthogonal to the plane defined by the flat.

4. The key according to claim 1, wherein the maximum radial projection formed by the collar is diametrically opposed to the flat.

5. A device for attaching a dial comprising at least one foot engaged through a first housing of a horological structure and at least one key according to claim 1, the rod of which is engaged in a second housing adjacent to the first housing, the device being configured so that, in a first angular position, referred to as the position of rest, the flat avoids any contact with the foot and, in a second angular position, referred to as the attaching position, when the key is rotated about the longitudinal axis of the head, from its position of rest as far as its attaching position, said collar comes into contact with the foot through the minimum radial projection that it forms with respect to the periphery of the head.

6. The key according to claim 1, wherein the minimum radial projection is less than or equal to 0.10 millimeters.

7. The key according to claim 1, wherein a radial projection of the collar increases continuously from the minimum radial projection to the maximum radial projection.

* * * * *